United States Patent [19]

Hagqvist

[11] Patent Number: 5,429,744
[45] Date of Patent: Jul. 4, 1995

[54] SPACER ELEMENTS BETWEEN MEMBRANE SURFACES OF A FLUID PURIFIER, AND A METHOD FOR THEIR MANUFACTURE

[75] Inventor: Peter Hagqvist, Älvsjö, Sweden

[73] Assignee: AB Electrolux, Stockholm, Sweden

[21] Appl. No.: 126,608

[22] Filed: Sep. 27, 1993

[30] Foreign Application Priority Data

Sep. 28, 1992 [SE] Sweden ............... 9202791

[51] Int. Cl.⁶ .................................. B01D 27/06
[52] U.S. Cl. .................. 210/493.1; 210/488; 210/499; 210/503; 210/493.3; 156/474; 156/423; 156/60; 428/123; 428/130
[58] Field of Search ............ 210/503, 488, 489, 490, 210/493.1, 483, 493.3; 156/60, 66, 81, 474, 423; 428/121, 123, 130

[56] References Cited

U.S. PATENT DOCUMENTS

| | | | |
|---|---|---|---|
| 3,260,370 | 7/1966 | Schwartzwalder | 210/489 |
| 3,280,985 | 10/1966 | Czerwonka | 210/493.1 |
| 3,751,323 | 8/1973 | Cowen | 156/474 |
| 4,199,457 | 4/1980 | Esmond | 210/493.1 |
| 5,084,178 | 1/1992 | Miller et al. | 210/493.1 |
| 5,225,080 | 7/1993 | Karbachsch et al. | 210/489 |

FOREIGN PATENT DOCUMENTS 154002 12/1979 Denmark.

Primary Examiner—Robert A. Dawson
Assistant Examiner—Ana M. Fortuna
Attorney, Agent, or Firm—Cushman Darby & Cushman

[57] ABSTRACT

In a method of producing spacer elements between pairs of mutually facing membrane surfaces for a fluid purifier, to minimize the number of separate parts required in the assembly of a membrane module for the fluid purifier, the sides of mutually parallel strings of spacer material are joined with the surfaces obliquely to a longitudinal extension of the surfaces. The surfaces are turned to face one another with respective parallel strings intersecting and abutting one another.

14 Claims, 2 Drawing Sheets

SPACER ELEMENTS BETWEEN MEMBRANE SURFACES OF A FLUID PURIFIER, AND A METHOD FOR THEIR MANUFACTURE

BACKGROUND OF THE INVENTION

The present invention relates to a method of producing spacer elements between pairs of mutually facing surfaces of layers comprising filter or membrane material for a fluid purifier. The invention also relates to a spacer element produced in accordance with the method.

In addition to holding the surfaces apart, such spacer elements also serve to generate turbulence so as to minimize the thickness of the boundary layer of the fluid that shall pass between the surfaces.

Known spacer elements of this kind are normally comprised of sheet-like grid or net constructions which are placed loosely between the mutually facing membrane surfaces, so as to permit turbulent fluid flow therebetween. When attempting to mechanize production of membrane modules Lot fluid purifiers, the separate spacer elements are in contrast to the desire to handle as few construction elements as possible when assembling the modules. Another problem caused by the loosely placed spacer elements is that vibrations in the membrane modistes cause the elements to move slightly in relation to the thin membrane surfaces lying against the spacers with the associated risk of wearing-down the membrane surfaces.

SUMMARY OF THE INVENTION

An object of the present invention is therefore to avoid the drawbacks of the known technique and to provide a spacer element which is more integrated with the membrane surfaces.

According to one aspect of the invention, each string of a layer of mutually spaced and mutually parallel strings of spacer material is joined to a respective membrane surface obliquely to a longitudinal extension of the surfaces, whereafter the surfaces are disposed with respective strings intersecting and abutting one another. Because the strings are joined to the membrane surfaces prior to fitting the membrane module, it is no longer necessary to provide an additional separate construction element for each pair of membrane surfaces. Furthermore, as a result of joining the spacer strings to the membrane surfaces, the spacer elements are no longer able to move in a manner to cause wear on the membrane surfaces, but will move only relative to one another and thereby possibly function as a sacrificial material.

It is also known to achieve a spacer function between heat-exchanger plates by providing the plates with mutually intersecting ridges or folds. Since the only feature that this technical field, comprising heat transfer between impermeable rigid surfaces, has in common with the present invention lies in the spacer function, it is not thought that the skilled person can be guided towards the present invention from as the basis of this particular known technique.

Other features of the invention and advantages afforded thereby will be evident from the following description.

DETAILED DESCRIPTION

Figure 1:
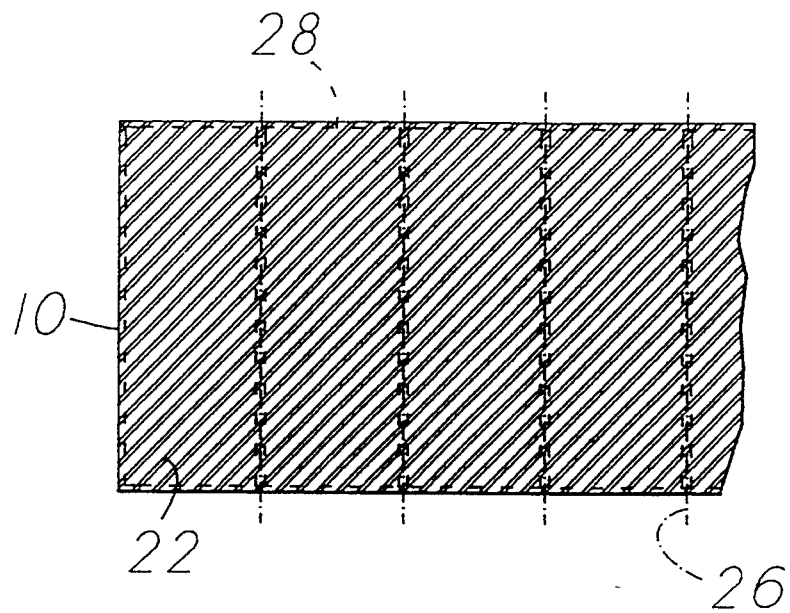
FIG. 1 is a top view of part of a web-like membrane material provided with spacer elements in accordance with the invention.

The layer of filter or membrane material 10 shown schematically in the drawings is intended to form a component of a fluid membrane module (not shown) for a fluid purifier, for instance a water purifier. The reader is referred to the present inventor's copending U.S. patent application Ser. No. 08/123,896, filed Sep. 20, 1993 for a more detailed description of this membrane module.

The web-like pliable membrane material 10 is composed in a known manner from a thin membrane layer 12, for instance an osmosis membrane, and a porous carrier layer 16 of non-woven material for instance, laminated thereon.

According to one embodiment of the invention, a layer of mutually spaced and mutually parallel strings 22 of spacer material, e.g. a plastic material, is formed on the outer surface 14 of the membrane layer 12. The strings 22 are positioned obliquely to a major direction or longitudinal direction of the membrane layer 10. The strings 22 can be produced and joined to the membrane layer 12 in any suitable way. For instance, the strings 12 can be extruded from a multi-die extruder and placed on the surface 14 and joined to the layer 12 either in conjunction with the extrusion process or in a subsequent operation by melting, melt-gluing, gluing, taping or some other joining method, with or without additive material. However, it is also possible to apply the strings from, e.g., one or more reels of thread material with the aid of a thread feeder which moves relative to the membrane layer and places the threads in, e.g., a zig-zag pattern on the surface (not shown).

The surfaces 24 (FIG. 2) of the strings 22 are then joined to the membrane layer 12, suitably over the full length of the strings, so as to obtain an intimate bond 20 with the layer so that the strings 22 and the layer 24 are not permitted to rub wearingly against one another, but will move together or utilize the intrinsic elasticity of the materials during those small movements that can occur in operation.

Although not shown, the strings may alternatively also be formed integrally and uniformly with the layer of filter or membrane material. In this case, the strings may have the form of beads or fins produced, for instance, by local material concentrations, which can be generated in different ways known within polymer techniques, for instance by local wrinkling or pleating of material present in the layer.

Figure 2:
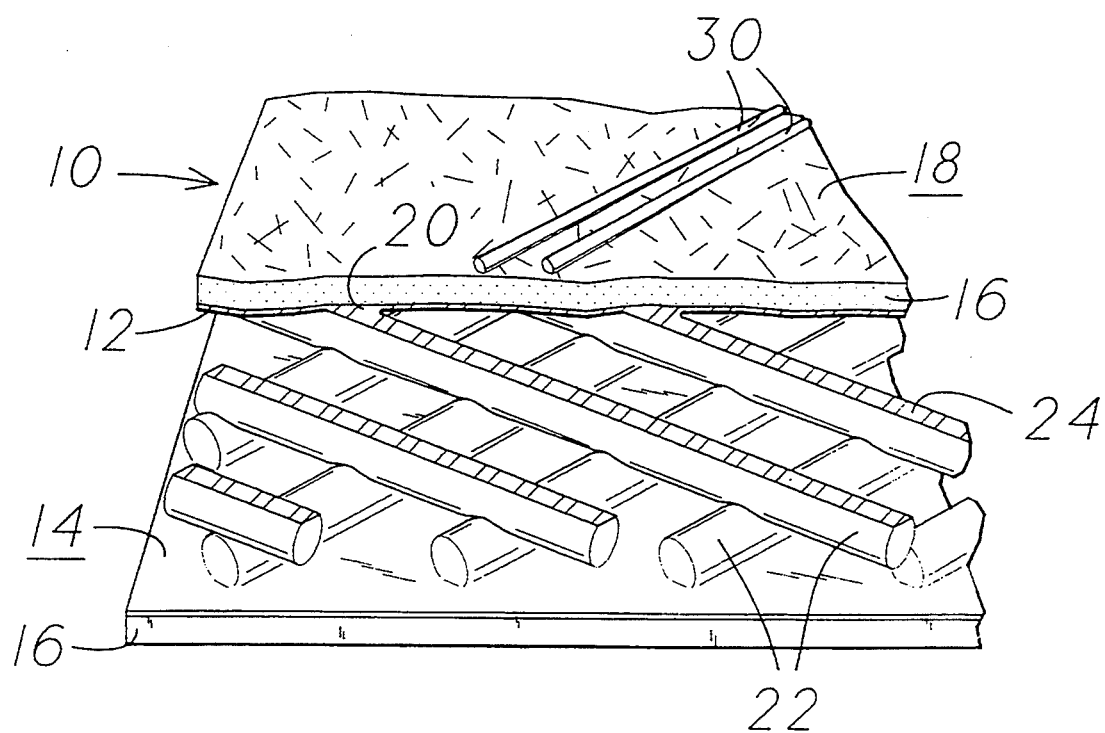
FIG. 2 is a perspective view in larger scale which shows parts of two mutually facing sides of membrane material according to FIG. 1.

The finished spacer element (feed spacer) is obtained by combining two membrane layers 12 with their respective strings 22 in mutual abutment and positioned in a mutually crossing pattern, as shown in FIG. 2. This is achieved conveniently by folding the membrane web in FIG. 1 transversely and alternately in different directions along lines 26. The grid construction formed by the superimposed string layers include free flow spaces in which pressurized fluid to be purified is accommodated, in that a part of the fluid is able to penetrate the membrane layer 12 through reverse osmosis or some other filter effect. Although it lies within the scope of the invention also to join together the mutually intersecting strings, the strings are solely placed together in the preferred embodiment. In this way, any relative movement is shifted and delimited to the area between the strings, so that the strings are permitted to act in a wearing fashion on one another and, if so desired, to serve as sacrificial material, while not permitting harmful forces to occur in the sensitive region at the interface between the strings and the active membrane surface.

Prior to being folded, two membrane webs with associated strings 22 can be joined sealingly together with their carrier-layer sides 18 facing towards one another, along the broken lines shown in FIG. 1 so as to form cavities 28 in the form of fluid-impervious defined spaces for the purified fluid in the finished membrane module, wherein spacer elements (permeate spacers) are also provided in the cavities 28. The purified fluid can be taken-out through openings (not shown) in the cavities or hollows 28 in different ways known to the art.

Figure 3:
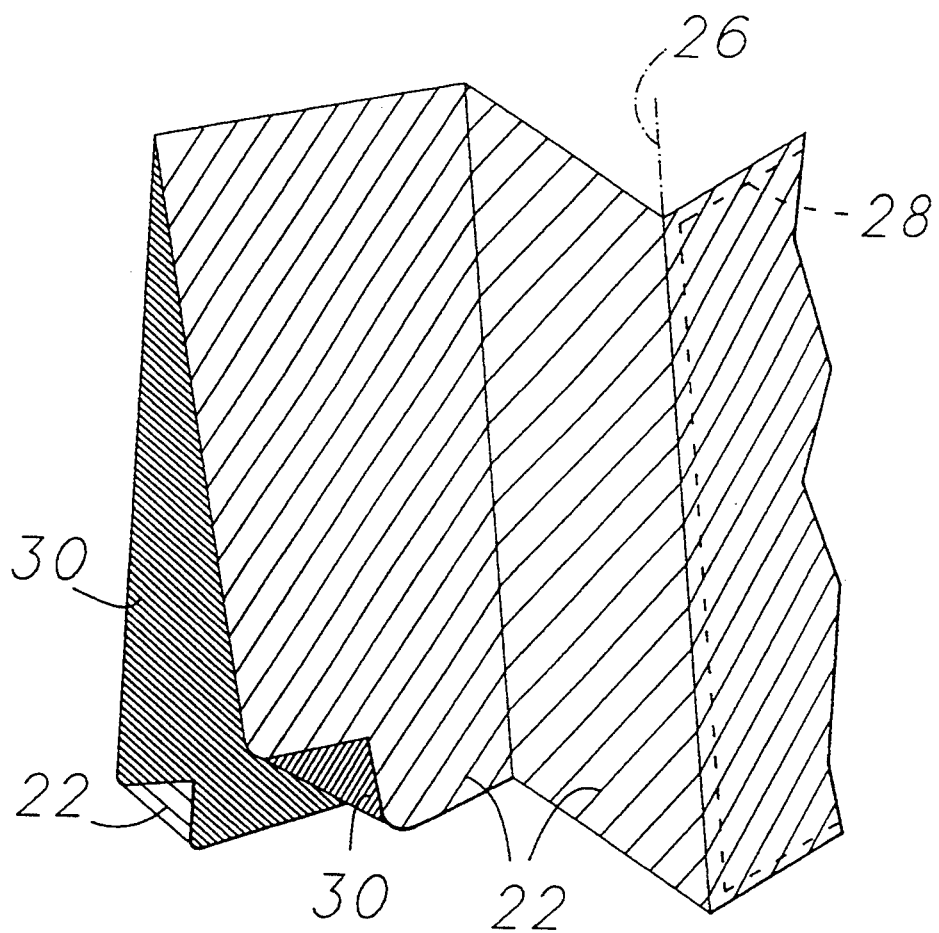
FIG. 3 illustrates part of a membrane web with two arrays of spacer elements, and shows the web during a folding operation.

As indicated schematically in FIG. 2, these further spacer elements may be formed in a manner corresponding to the mutually intersecting strings 22, by providing the carrier-layer sides 18 of the membrane webs with layers of mutually parallel strings 30. In this regard, the requisite two arrays of spacer elements may be provided on opposing sides of a single membrane web, so that only one or a pair of work pieces need to be worked and handled in the manufacture of a membrane module. The principle of this manufacture is illustrated in FIG. 3, which shows a single double-sided, string-provided membrane web which is first folded in its longitudinal direction and then in different directions transversely to its longitudinal direction.

I claim:

1. A method for providing a fluid purifier filter or membrane material with spacer elements, comprising:
   (a) providing at least one layer of filter or membrane material web each having a first and a second opposite surfaces having a longitudinal direction extending along said web;
   (b) providing a plurality of mutually laterally spaced strings of spacer material on said web first surface;
   (c) orienting said strings obliquely relative to said longitudinal direction and joining each, substantially completely along its length, to said first surface of each said web;
   (d) doubling said web back upon itself along a fold line extending transversally of said longitudinal direction, so as to cause respective portions of said first surface to face one another but be spaced apart from one another by engagement of spaced segments of respective ones of said strings.

2. The method of claim 1, wherein:
   in practicing step (c), said strings are joined to said first surface by integrally forming said strings with said first surface.

3. The method of claim 1, wherein:
   in practicing step (c), said strings are extruded and then bonded to said first surface.

4. The method of claim 1, wherein:
   in practicing step (c), said strings are glued to said first surface.

5. The method of claim 1, wherein:
   in practicing step (c), said strings are melt-bonded to said first surface without interposition of any glue apart from material of said strings and said first surface.

6. The method of claim 1, further comprising, prior to conducting step (d):
   (ci) providing a plurality of mutually laterally spaced second strings of spacer material on said web second surface;
   (cii) orienting said second strings obliquely relative to said longitudinal direction and joining each, substantially completely along its length, to said second surface of each said web; and
   (ciii) doubling said web back upon itself along a longitudinal fold line, so as to cause respective portions of said second surface to face one another but be spaced apart from one another by engagement of spaced segments of respective ones of said second strings.

7. The method of claim 6, further comprising, between conducting steps (ciii) and (d):
   sealing respective portions of each said web to one another along a line which extends first transversely of said longitudinal direction away from said longitudinal fold line, then longitudinally and then transversely of said longitudinal direction back towards said longitudinal fold line, thereby defining a cavity within each such longitudinally folded web.

8. A fluid purifier filter or membrane material having spacer elements, comprising:
   (a) at least one layer of filter or membrane material web each having a first and a second opposite surfaces having a longitudinal direction extending along said web;
   (b) a plurality of mutually laterally spaced strings of spacer material on said web first surface;
   (c) said strings being oriented obliquely relative to said longitudinal direction and joined each, substantially completely along its own length, to said first surface of each said web;
   (d) said web being doubled back upon itself along a fold line extending transversally of said longitudinal direction, so as to cause respective portions of said first surface to face one another but be spaced apart from one another by engagement of spaced segments of respective ones of said strings.

9. The fluid purifier filter or membrane material of claim 8, wherein:
   said strings are joined to said first surface by being integrally formed with said first surface.

10. The fluid purifier filter or membrane material of claim 8, wherein:
    said strings are extrusions which are bonded to said first surface.

11. The fluid purifier filter or membrane material of claim 8, wherein:
    said strings are joined to said first surface by being attached by glue to said first surface.

12. The fluid purifier filter or membrane material of claim 8, wherein:
    said strings are joined to said first surface by being melt-bonded to said first surface without interposition of any glue apart from material of said strings and said first surface.

13. The fluid purifier filter or membrane material of claim 8, further comprising:

(ci) a plurality of mutually laterally spaced second strings of spacer material on said web second surface;

(cii) said second strings being oriented obliquely relative to said longitudinal direction and each being joined, substantially completely along its length, to said second surface of each said web; and (ciii) said web being doubled back upon itself along a longitudinal fold line, so that respective portions of said second surface to face one another but are spaced apart from one another by engagement of spaced segments of respective ones of said second strings.

14. The fluid filter or membrane material of claim 13, further including:

respective portions of each said web being sealed to one another along a line which extends first transversely of said longitudinal direction away from said longitudinal fold line, then longitudinally and then transversally of said longitudinal direction back towards said longitudinal fold line, thereby defining a cavity within each such longitudinally folded web.

* * * * *